United States Patent
Dobosan et al.

[15] 3,702,916
[45] Nov. 14, 1972

[54] WELDING UNIT FOR MOTOR CAR WHEELS

[72] Inventors: Valerio Dobosan, Brasov; Nicolae Cascaval, Orasul Sacele, both of Romania

[73] Assignee: Uzina de Autocamioane "Steagul Rosu" Brasov Str. Poienelor, Brasov, Romania

[22] Filed: Jan. 4, 1971

[21] Appl. No.: 103,677

[52] U.S. Cl. .......................... 219/125 R, 219/60 A
[51] Int. Cl. .............................................. B23k 9/12
[58] Field of Search ........ 219/124, 125 R, 126, 60 A, 219/60 R, 61, 127, 137, 130, 87, 76

[56] References Cited

UNITED STATES PATENTS

| | | |
|---|---|---|
| 1,886,503 | 11/1932 | Shockey ..................... 219/124 |
| 3,062,950 | 11/1962 | Chyle ......................... 219/127 |
| 3,119,536 | 11/1964 | Berkely .................. 219/130 X |
| 2,745,935 | 5/1956 | Powley ................... 219/124 X |

Primary Examiner—R. F. Staubly
Assistant Examiner—L. A. Schutzman
Attorney—Karl F. Ross

[57] ABSTRACT

A welding unit for motorcar wheels has a pair of interchangeably mounted welding heads on a horizontal rail for selective alignment with an elevatable and rotatable support for the wheel. The head has a plurality of angularly equispaced electrode-wire feed devices for welding each of the spokes of the wheel but driven by a common motor.

10 Claims, 2 Drawing Figures

WELDING UNIT FOR MOTOR CAR WHEELS

FIELD OF THE INVENTION

Our present invention relates to an apparatus for welding internal seams and, more particularly, to an apparatus for welding the spokes of the wheel disk of an automotive vehicle wheel.

BACKGROUND OF THE INVENTION

In attempts to automate the production of wheels for automotive vehicles, the generally cylindrical felly or rim is welded automatically to the central portion or hub at a plurality of angularly equispaced spokes along an annular seam from the interior of the wheel disk. Of course, external welds may also be provided and to some degree at least hand-welding has been replaced by automatic or machine welding.

In most machine-welding systems, a single electrode wire is fed to the weld seam while the workpiece is rotated or the head is rotated to carry the weld seam completely around the wheel. It has also been proposed to provide a number of welding heads for forming individual welds or segments of the complete weld seam, but these arrangements are massive, complex and prone to breakdown.

Single-wire systems have the disadvantage that they are relatively slow and cannot adequately be integrated into a mass-production line. Finally, with respect to such prior mechanisms, it should be noted that conventional welding heads are generally not capable of welding seams at a location deep within the wheel and hence cannot be used for welding torque wheels and other wheels of considerable rim width or wheel depth.

Furthermore, it is frequently desirable to provide a protective gas for the welding process, i.e., a nonoxidizing or antioxidizing gas such as carbon dioxide, helium, nitrogen or another oxygen-excluding gas with a carbon-dioxide medium. However, the welding guides or forward elements of each of the multiple heads are subjected to high temperatures and spattered molten metals so that the heads must be removed for repair or replacement of various parts. In conventional arrangements, this requires shutdown of the production line or at least the diversion of the wheels to be welded from the normal production line.

OBJECTS OF THE INVENTION

It is the principal object of the present invention to provide an improved apparatus for welding annular bodies.

It is another object of this invention to provide an apparatus for the welding of automotive vehicle wheels which is free from the disadvantages discussed above.

An object of the invention is also to be found in the provision of a relatively low-cost, simple and readily operable apparatus for the high-speed welding of internal seams.

Yet a further object of the invention is to provide a welding apparatus of the class described which, when requiring repair or maintenance, does not cause breakdown of the production line.

SUMMARY OF THE INVENTION

The above and other objects of the invention are attained in accordance with out invention which provides an apparatus for welding internal seams having a welding head axially spaced from a workpiece support or table, the head being provided with a number of angularly equispaced electrode-wire guides, equal in number and orientation to the spokes to be welded. The holder of the welding head also carries respective feed means associated with each of the guides for advancing a respective electrode wire therethrough and a common drive means for all of these feed mechanisms. Means is provided for relatively displacing the head and the support axially, preferably by advancing the support in the direction of the head which is fixed with regard to axial displacement.

According to a more specific feature of this invention, the head is carried by a rail and can be locked thereto in alignment with the support, but is movable along this rail to allow a similar second head to be positioned thereon in alignment with the support. This allows the first head to undergo maintenance and repair while the second head maintains the welding operation, thereby preventing interruption of the production line.

Yet another feature of the invention resides in the provision of the common feed means as a central worm rotatable about the axis and meshing with a plurality of worm wheels, each being connected by respective gear means to roller arrangements for advancing the electrode wire through the guides.

According to still another feature of this invention, the support structure is itself mounted by columns or posts upon the rails and depends therefrom in the form of a housing within which the table is journaled upon a shaft and is connected thereto by key means in the form of, for example, splines to permit axial displacement of the table while the latter is rotatably entrained by the shaft which is held against axial displacement in suitable bearing means. On the other hand, the rail may be carried by the posts of the housing. A motor in this housing is connected via a clutch with the shaft for rotation of the turntable over a fraction of a revolution corresponding to the arc length of the spoke seam, while a yoke acts upon the table via thrust-bearing means and, in turn, is displaced by piston-and-cylinder means located at the housing to an extent determined by adjustable stops carried by the housing.

It will be apparent that the resulting structure is a simple and sturdy unit capable of simultaneously welding all of the spokes within the wheel. Of course, means may be provided to form the welds externally of the wheel as well. Advantageously, the table lies along a wheel production line and means can be provided in the housing to receive the electrical circuitry for energizing the welding electrode. Above the head, coils of electrode wire or rod may be provided. The welding wire or rods are fed generally radially outwardly by the feed means.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
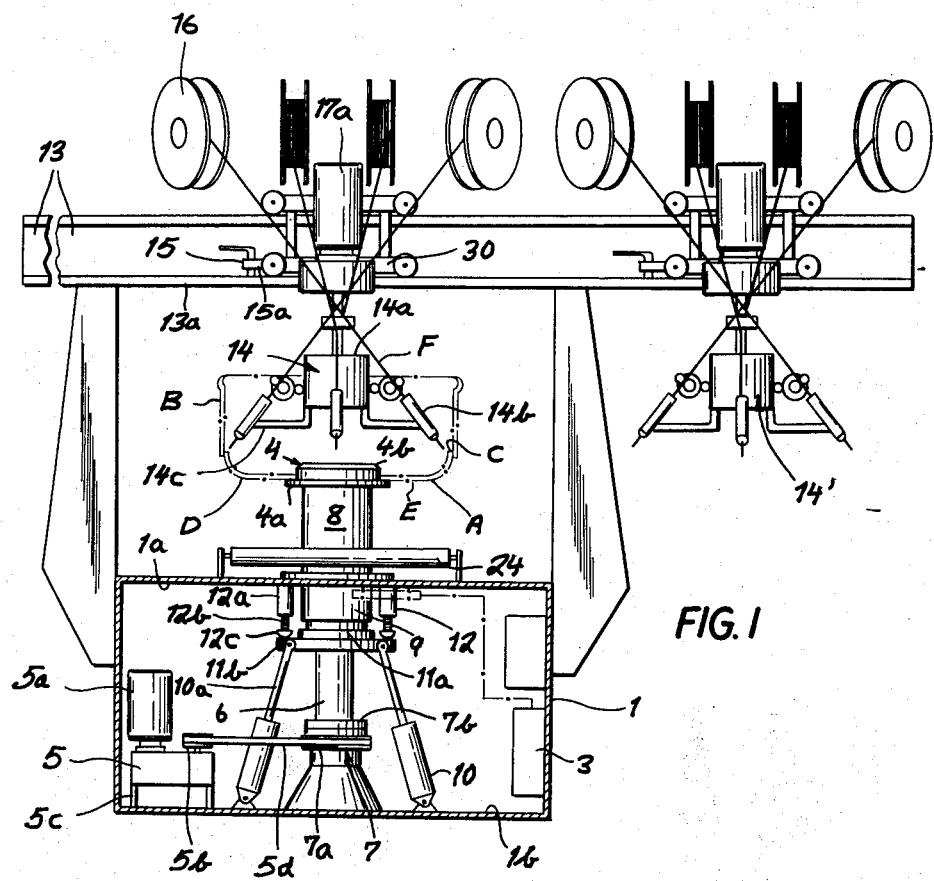
FIG. 1 is a vertical elevational view, partly broken away, of an apparatus embodying the present invention.

In the drawing, we show an apparatus for welding a rim or felly B to a wheel disk A at internal seams C along a plurality of spokes D and E, two of which have been shown in dot-dash lines in FIG. 1. The external welds may also be provided with another array of welding heads but, since the external welding devices are not material to the present invention, they have not been illustrated.

The apparatus comprises a rigid parallelopipedal body 1 constituting a housing and extended by a pair of columns 2 from a rail 13. Within the housing 1, there is provided the electrical circuitry 3 for the arc-welding system which may be connected to the continuously fed wire electrode and to the workpiece by suitable conductors illustrated only in part. The columns 2 may be electrically conductive so that one terminal of the arc-welding source may be connected to the rail 13.

Also within the housing 1, we provide a lifting and rotating assembly 4 constituting the workpiece support and comprising the table 4a supporting the disk A and having a cylindrical boss 4b for centering the disk. A motor 5a mounted upon a speed-reducing transmission 5 is supported by pedestals 5c in the housing and has an output pulley 5b connected by a belt 5d to the driven pulley 7a of a clutch 7. The output member 7b of this clutch is provided upon an upright shaft 6 which is journaled in a bearing 6a on the housing 1. The clutch 7, 7a, 7b is operated by a cam arrangement (not shown) and is designed to swing the workpiece angularly through a distance corresponding to the arc length of the weld seam to be formed between the rim and each of the spokes.

The shaft 6 is splined to the shaft 8 which telescopingly fits over the shaft 6 and is axially shiftable thereon while being rotatably entrained by shaft 6. The shaft 8 extends through an opening in the roof 1a of the housing 1 and is formed at its lower end with a bronze sleeve 9 which can be engaged by a brush 9a shown in dot-dash lines for delivering electric current to the workpiece A − E. The shaft is also formed at its bottom end with a thrust bearing 11a in rolling contact with a collar 11 forming swivels 11b for a plurality of piston rods 10a each received within a cylinder 10 articulated to the floor 1b of the housing 1.

The pneumatic cylinders 10 are offset laterally from the lifting device and upon actuation elevate the shaft 8 and hence the workpiece A–E. When the cylinders are depressurized, the workpiece is gradually lowered. Instead of a collar 11, moreover, a yoke extending around the shaft 6 may be provided as the point of attack of the cylinders 10.

Depending from the roof 1a of the housing 1 are a number of adjusting devices generally represented at 12 and consisting of sleeves 12a into which spindles 12b are threaded, the heads 12c forming adjustable stops for the yoke or collar 11. The stop arrangements 12 can be set to position the seams at any desired distance from the welding wires F.

The rail 13 carries a pair of welding devices represented generally at 14 and 14' and interchangeably positionable above the workpiece A − E so that, when one of the workpieces is undergoing maintenance or repair, the other may be operative and vice versa.

Figure 2:
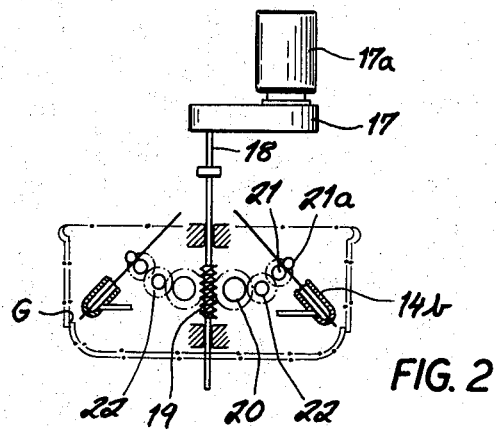
FIG. 2 is a detail view showing the electrode-feed means.

Each of the welding heads 14 and 14' comprises a carriage 30 on which are supported reels 16 of welding wire (electrode wire) F, the reel supports having been omitted in the drawing for clarity. In addition, the rolling carriage 30 is formed with a lock 15 which is threadedly received in a projection 15a of the carriage and is engageable, upon rotation, with the lower flange 13a of the rail to prevent further horizontal displacement of the head. A motor 17a is mounted in the carriage and is connected by a speed-reducing transmission 17 with an input shaft 18, the latter, in turn, driving a worm 19 within a housing 14a upon which the welding wire guide members and gas nozzles 14b are mounted by tubular brackets 14c serving to feed a protective gas, e.g., carbon dioxide, into the region of the weld seam. The worm 19 drives a plurality of worm wheels 20 which, in turn, mesh with idler gears 22 and wire-feed wheels 21 to advance the welding wires F into juxtaposition with the joint G to be welded (FIG. 2).

Counterrollers 21a co-operate with the wheels 21 to advance the welding wires. A respective guide and gas nozzle 14b is provided for each of the seams to be formed and, therefore, for each spoke of the finished wheel, along with a respective electrode-wire feed system and the corresponding reel. When the table 4 is lowered, it can be brought into horizontal alignment with a roller conveyor or track 24 which delivers the wheel disk and the rim to the table.

OPERATION

If is is assumed that the welding system 14' is undergoing nozzle replacement or other maintenance or repair, and welding system 14 has been locked in place by member 15, successive wheel assemblies are delivered by the roller conveyor 24 to the table 4. The latter is raised to position each wheel assembly upon the table and juxtapose the joint G with the weld wire. The welding current is applied, motor 17a started and motor 7, operated to simultaneously strike the welding arc, deposits weldment from the weld wire, advances the weld wire to compensate for consumption of the weld material, and rotates the workpiece to form the weld along the entire arc of the wheel spoke associated with a particular welding electrode.

Hence, the seam is formed simultaneously at all of the spokes. As soon as the seam at each spoke has been completed, the cam operates clutch 7 to terminate rotation of the table whereupon the latter may be lowered and the welded wheel deposited upon a downstream roller track while a new wheel assembly is positioned at the table.

It will be apparent that the system of the present invention has the advantage that it permits welding with high efficiency for internal and deep seams as well as for any external seams which may be necessary, it permits production to be continued even after a breakdown of one of the welding heads, it produces all of the seam welds simultaneously with a single motive force for advancing the electrodes and controlling the electrode wires, and it enables replacement of parts of the welding head without difficulty.

The improvement described and illustrated is believed to admit of many modifications within the ability of persons skilled in the art, all such modifications being considered within the spirit and scope of the invention except as limited by the appended claims.

We claim:

1. An apparatus for welding internal seams of a concave workpiece, comprising:
   a support for said workpiece centered on an axis and having an internal seam to be welded, said workpiece being open axially in a direction away from said support;
   a welding head spaced along said axis from said support in said direction and aligned with said support, said head including:
      a holder operatively aligned with said support along said axis,
      a plurality of electrode-wire guides adapted to be trained at said seam, said guides being mounted on said holder and angularly spaced about said axis and directed outwardly from said axis in the opposite direction at said seam,
      respective feed means on said holder associated with each of said guides for advancing an electride wire therethrough generally in a radial plane of said axis, and
      common drive means on said holder for operating all of said feed means; and
   means for relatively displacing said head and said support axially to juxtapose the electrode wires with said seam.

2. The apparatus defined in claim 1 wherein each of said feed means includes at least one feed roller engaging the respective electrode wire and rotatable for advancing same, said common drive means including a worm lying along said axis, a motor for driving said worm, a plurality of worm wheels meshing with said worm and axially spaced about said axis and respective gear means for operatively connecting each of said worm wheel with the respective roller.

3. The apparatus defined in claim 2 wherein said support is rotatable about said axis and said head is fixed with respect to movement along said axis, said means for relatively displacing said head and said support including means for axially shifting said support, said apparatus further comprising a second motor operatively connected with said support for rotating same about said axis.

4. The apparatus defined in claim 3 wherein said workpiece is a motor-vehicle wheel disk having a generally cylindrical portion open axially in the direction of said head and a spoke portion adapted to be welded to said cylindrical portion at a plurality of angularly spaced spokes, the number of said electrode-wire guides being equal to the number of such spokes and said guides being angularly equispaced corresponding to said spokes.

5. The apparatus defined in claim 4, further comprising a horizontal rail carrying said head, said head depending from said rail and being shiftable therealong out of alignment with said support, said apparatus including a further similar head alignable with said support to said rail.

6. The apparatus defined in claim 5 wherein said support includes a platform receiving said wheel disk and rotatable about said axis, a shaft lying along said axis and keyed to said table while being rotatable by said second motor, said means for axially shifting said support including a yoke adapted to entrain said table vertically while being journaled relatively thereto, and fluid-responsive piston-and-cylinder means connected with said yoke for axially shifting same.

7. The apparatus defined in claim 6, further comprising a clutch interposed between said second motor and said shaft.

8. The apparatus defined in claim 7, further comprising means for suspending said support from said rail.

9. The apparatus defined in claim 8, further comprising a housing enclosing said shaft, said yoke, said second motor and said piston-and-cylinder means, and adjustable stop means on said housing engageable with said yoke for limiting the axial displacement of said table.

10. The apparatus defined in claim 9, further comprising means for surrounding said electrode wires with a nonoxidizing gas.

* * * * *